Dec. 8, 1959 W. GISKES 2,915,907

PHONOGRAPH TURNTABLE

Filed Feb. 16, 1954

INVENTOR
WILLEM GISKES
BY [signature]
AGENT

United States Patent Office 2,915,907

Patented Dec. 8, 1959

2,915,907

PHONOGRAPH TURNTABLE

Willem Giskes, Eindhoven, Netherlands, assignor, by mesne assignments, to North American Philips Company, Inc., New York, N.Y., a corporation of Delaware Application February 16, 1954, Serial No. 410,604

Claims priority, application Netherlands February 21, 1953

4 Claims. (Cl. 74—216)

This invention relates to a disc which is obviously intended for use in a gramophone of which the turntable is driven by means of frictional wheels.

In gramophones of the above-mentioned kind the vibrations which occur in the electric motor, for example as a result of irregularities, are transferred by one or more frictional wheels to the turntable. Irregularities in the frictional wheels themselves, for example due to unevenness in the frictional surface, may also be transferred to the turntable. This results in irregularities in the movement of the turntable which occur more or less abruptly so that the sound reproduction is detrimentally affected.

The object of the invention is to reduce these detrimental influences to a minimum.

According to the invention, for this purpose at least an edge for the frictional contact of the disc consists of elastic damping material, for example rubber, the edge being of a shape such that a load in the tangential direction of the disc causes the elastic material to be deformed substantially in the direction of its length, whereas a load in both the axial and the radial directions of the disc causes the elastic material to be deformed substantially in the direction at right angles to the longitudinal direction thereof.

The use of the disc according to the invention in the driving mechanism for the turntable affords the advantage that the irregularities in both the axial and the radial directions of the disc are substantially eliminated in these directions due to the great deformability and the damping properties of the disc, so that the irregularities are for an important part not transferred to the movement of the turntable. On the other hand, the fact that a load in the tangential direction causes the material of the disc to be deformed substantially in its longitudinal direction ensures sufficiently rigid transmission in the direction of rotation. By suitable choice of the mass of the turntable it is avoided as far as possible that irregularities in the direction of rotation may exert an interfering influence upon the movement of the turntable.

It will be evident that it is not necessary for the disc to consist wholly of elastic material and to be formed in the above-described shape. It suffices that the edge for the frictional contact of the disc is shaped in accordance with the invention, since irregularities will already be eliminated by this edge.

It is possible for the disc to be provided directly on the shaft of the electric motor. However, in a suitably chosen embodiment the disc is constituted by the turntable which comprises the edge of elastic damping material, since in this case it is also possible to eliminate irregularities which occur in the driving mechanism between the motor shaft and the turntable. However, the disc is preferably constituted by an intermediate wheel for driving a turntable, the transmission ratio then being fixed due to the constant diameters of the disc on the shaft of the motor and of the turntable. In order to avoid the difficulty which occurs upon starting the gramophone wherein a frictional wheel which can move freely in its plane is clamped between the motor shaft and the turn table. Due to the direction of rotation of the motor shaft the weak construction of the disc may be unduly deformed because of the fairly considerable inertia forces which have to be overcome upon starting and may thus slide away from between the motor shaft and the turntable. The disc is in this case shaped in such manner that a load in the radial direction of the disc causes the material to be deformed through a predetermined distance only substantially in the direction at right angles to its longitudinal direction, whereas upon continued load deformation occurs substantially in the direction of the material.

It will be evident that it is also possible for the disc on the shaft of the motor as well as the intermediate wheel and the turntable or, if desired, two of them to be realised in accordance with the invention.

In order that the invention may be readily carried into effect, it will now be described with reference to the accompanying drawing showing, by way of example, some embodiments thereof.

Figure 1:
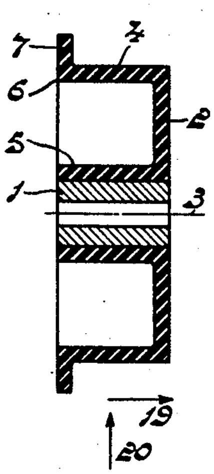
Fig. 1 is a sectional view of a frictional wheel according to the invention for driving a turntable.

Referring now to Fig. 1, reference numeral 1 indicates the sleeve on which a wheel 2 is mounted. The cross-section of the wheel is U-shaped on each side of a shaft 3, the limbs 4 and 5 extending parallel to the shaft 3 and the loose extremity 6 of the limb 4 being provided with an upright edge 7. The outer periphery of the edge 7 serves for the frictional contact.

Figure 2:
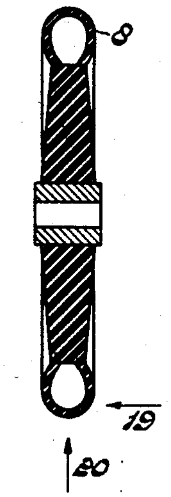
Fig. 2 is a sectional view of a variant of the frictional wheel shown in Fig. 1.

In Fig. 2 a frictional wheel comprises a hollow torus-shaped edge 8, of which the outer periphery serves for the frictional contact with the turntable and the shaft of the motor.

Figure 3:
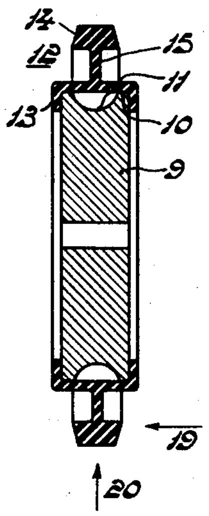
Fig. 3 is a sectional view of a third possible construction of the frictional wheel according to the invention.

In Fig. 3 the central portion 9 of the intermediate wheel is externally provided with an endless groove 11.

The intermediate wheel furthermore comprises an edge 12 of elastic material, of which circular rings 13 and 14, arranged concentrically, are connected by means of a ring 15 which is located in the surface of the groove 11. The ring 13 of smaller diameter covers the groove 11 in the central portion 9, the ring 14 being intended for the frictional contact.

Figure 4:
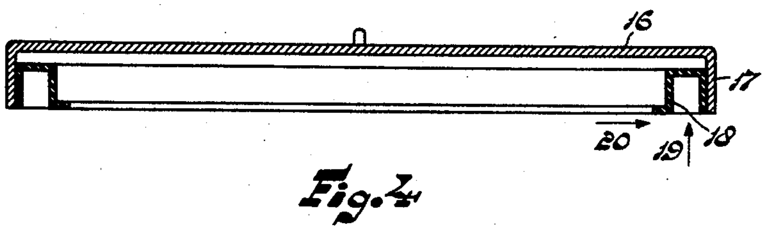
Fig. 4 is a sectional view of a turntable for a gramophone comprising the edge of elastic damping material according to the invention.

In Fig. 4 a turntable 16 is provided, on the inner side of its bent edge 17, with an edge 18 of elastic material. The shape of the edge 18 is identical with that of the intermediate wheel of Fig. 1. According to the method of driving, either the edge 18 or one of the edges shown in Fig. 2 or 3 may be provided either on the lower side of the turntable 16 or on the outside of the bent edge 17.

It will be evident from the figures that a load on the frictional surface in the direction at right angles to the plane of drawing causes the elastic material to be deformed substantially in the direction of its length, whereas a load in both the direction of the arrows 19 and the arrows 20 causes the material to be deformed substantially at right angles to the direction of its length. The load in the last-mentioned directions of the arrows 19 and 20 will substantially result in deflection, since as a rule the energy required for deflection is less than for extension or compression. In the embodiment shown in Fig. 3, deflection as a result of a load in the direction of arrow 20 is made possible by the groove 11 into which the ring 13 can bend.

In the embodiments shown in Figs. 2 and 3, a load according to arrow 20 will cause the hollow torus shaped edge 8 and the ring 13 of smaller diameter to be deformed only until they engage the central portion of the intermediate wheel which may be more or less rigid. By choosing a smaller space between the limbs 4 and 5 in the embodiment shown in Fig. 1, this deformation in the radial direction may also be limited at will.

What is claimed is:

1. A turntable disc having a central sleeve and comprising a resilient edge portion on the periphery of said turntable disc constituted of a layer of resilient material forming an engaging surface spaced from said central sleeve, and means connecting said layer of resilient material with said central sleeve including two yieldable rings one of which extends substantially in a radial direction and the other extending substantially in a direction parallel to the central axis of said sleeve, said rings and layer of resilient material being adapted to be deformed in said space upon the application of a force at right angles to the central axis of said turntable disc, the shape of said resilient material being such that a load in the tangential direction of the disc causes said resilient material to be deformed substantially in the direction of its length, and a load in both the axial and radial directions of said disc causes said resilient material to be deformed substantially in a direction at right angles to the direction of its length.

2. A turntable disc as set forth in claim 1 wherein said edge is hollow and toroidal-shaped for frictional contact.

3. A turntable disc as set forth in claim 1 wherein said disc is provided with an endless groove at its periphery, said groove being surrounded by a resilient damping material arranged on the circumference of said disc adjacent to said endless groove whereby when force is applied laterally to said resilient material the latter is caused to be deformed into said endless groove.

4. A turntable disc comprising a frictional wheel, at least one edge on said wheel being of elastic material and being of a shape such that a load in the tangential direction of the disc causes said elastic material to be deformed substantially in the direction of its length, and a load in both the axial and radial directions of said disc causes said elastic material to be deformed substantially in a direction at right angles to the direction of its length, the cross-section of at least one edge portion of said disc in a plane passing through the axis of said disc being substantially U-shaped, and one of said legs being provided with a flange extending substantially perpendicular from said edge portion.

References Cited in the file of this patent

UNITED STATES PATENTS

| | | |
|---|---|---|
| 607,986 | Davy et al. | July 26, 1898 |
| 722,977 | Hall | Mar. 17, 1903 |
| 1,293,622 | Roberts | Feb. 4, 1919 |
| 1,813,502 | Madsen | July 7, 1931 |
| 1,907,116 | Jenkins | May 2, 1933 |
| 1,979,561 | Lewis | Nov. 6, 1934 |
| 2,047,733 | Harrison | July 14, 1936 |
| 2,097,071 | Lichten | Oct. 26, 1937 |
| 2,261,889 | Schneider | Nov. 4, 1941 |
| 2,522,756 | Hall | Sept. 19, 1950 |
| 2,572,718 | Gifford | Oct. 23, 1951 |